United States Patent
Caruana

(10) Patent No.: US 10,382,097 B2
(45) Date of Patent: Aug. 13, 2019

(54) METHOD FOR MANAGING COMMUNICATION BETWEEN A CONTACTLESS READER AND A PORTABLE CONTACTLESS DEVICE

(71) Applicant: GEMALTO SA, Meudon (FR)

(72) Inventor: Jean-Paul Caruana, Cedex (FR)

(73) Assignee: GMEALTO SA, Meudon (FR)

( * ) Notice: Subject to any disclaimer, the term of this patent is extended or adjusted under 35 U.S.C. 154(b) by 0 days.

(21) Appl. No.: 16/076,894

(22) PCT Filed: Jan. 24, 2017

(86) PCT No.: PCT/EP2017/051412
§ 371 (c)(1),
(2) Date: Aug. 9, 2018

(87) PCT Pub. No.: WO2017/137249
PCT Pub. Date: Aug. 17, 2017

(65) Prior Publication Data
US 2019/0052314 A1 Feb. 14, 2019

(30) Foreign Application Priority Data

Feb. 11, 2016 (EP) ..................... 16305155

(51) Int. Cl.
*H04B 5/00* (2006.01)
*H04W 76/15* (2018.01)
(Continued)

(52) U.S. Cl.
CPC ....... *H04B 5/0031* (2013.01); *G06K 19/0723* (2013.01); *H01Q 1/242* (2013.01); *H01Q 5/25* (2015.01); *H04W 76/15* (2018.02)

(58) Field of Classification Search
CPC ...... H01Q 5/25; H01Q 1/242; G01S 13/0209; G06K 7/10306; G06K 19/0723;
(Continued)

(56) References Cited

U.S. PATENT DOCUMENTS

2005/0035862 A1* 2/2005 Wildman ............... A61B 5/1113
340/573.1
2007/0073935 A1* 3/2007 Kim ......................... G06F 13/38
710/62
(Continued)

OTHER PUBLICATIONS

Yavari, Mohammadreza. "Indoor Real-Time Positioning Using Ultra-Wideband Technology.", Aug. 2015 (Year: 2015).*
(Continued)

*Primary Examiner* — Devan A Sandiford
(74) *Attorney, Agent, or Firm* — Buchanan Ingersoll & Rooney PC

(57) ABSTRACT

The invention is a method of managing communication between a portable device and a contactless reader able to communicate using a first wireless technology configured to communicate in a short-range mode. The method comprises the steps of:
  establishing a first channel between the contactless reader and a wireless unit,
  establishing between the wireless unit and the portable device a second channel using a second wireless technology which is configured:
  to operate with a range greater than that of said first wireless technology,
  to detect the position of the portable device with respect to the wireless unit,
  to handle an anti-collision phase,
  establishing a bridge between the contactless reader and the portable device through said first and second channels only if the detected position of the portable device matches with the contactless reader.

14 Claims, 5 Drawing Sheets

(51) Int. Cl.
*G06K 19/07* (2006.01)
*H01Q 5/25* (2015.01)
*H01Q 1/24* (2006.01)

(58) Field of Classification Search
CPC .... H04B 5/0031; H04W 76/16; H04W 76/15; H04W 76/10; H04M 2250/04
See application file for complete search history.

(56) References Cited

U.S. PATENT DOCUMENTS

| | | | | |
|---|---|---|---|---|
| 2008/0212558 A1* | 9/2008 | Aillaud | ................ | G06K 7/0008 370/345 |
| 2012/0028579 A1* | 2/2012 | Fine | ................ | H04L 29/12254 455/41.1 |
| 2013/0092741 A1* | 4/2013 | Loh | ................ | G06Q 20/32 235/492 |
| 2013/0203351 A1* | 8/2013 | Hillan | ................ | H04B 5/00 455/41.1 |
| 2014/0020081 A1* | 1/2014 | Zhang | ................ | H04L 63/083 726/9 |
| 2015/0039494 A1* | 2/2015 | Sinton | ................ | G06Q 20/327 705/39 |
| 2016/0239795 A1* | 8/2016 | Burch, V | ................ | G06F 16/254 |

OTHER PUBLICATIONS

Connell, Ciaran. "What's the Difference Between Measuring Location by UWB, Wi-Fi, and Bluetooth?", Feb. 2015 (Year: 2015).*
International Search Report (PCT/ISA/210) dated Apr. 24, 2017, by the European Patent Office as the International Searching Authority for International Application No. PCT/EP2017/051412.
Written Opinion (PCT/ISA/237) dated Apr. 24, 2017, by the European Patent Office as the International Searching Authority for International Application No. PCT/EP2017/051412.

* cited by examiner

METHOD FOR MANAGING COMMUNICATION BETWEEN A CONTACTLESS READER AND A PORTABLE CONTACTLESS DEVICE

FIELD OF THE INVENTION

The present invention relates to methods of managing communication between a contactless reader and a portable contactless device. It relates particularly to methods of establishing a communication session between two contactless objects.

BACKGROUND OF THE INVENTION

The NFC (Near Field Communication) technology is based on the exchanging of data via a magnetic field. A NFC reader has an antenna which is able to modulate the magnetic field and to provide energy to NFC devices. The NFC reader is usually named a PCD (Proximity Coupling Device). A NFC device may be a PICC (Proximity Integrated Circuit Card or Proximity Card) or may embed components which act as logical PICC. For example, a NFC-enabled smartphone may embed a physical or logical PICC. A PICC and a PCD communicate thanks to an inductive coupling in a field frequency equal to 13.56 MHz. In particular, the ISO14443 and ISO18092 standards provide modulation technologies and communication protocols which may be used in NFC domain.

When a user want to perform a transaction with a NFC reader, he must bring his PICC close to the NFC reader. This operation is known as a "tap". Thus the user must make a precise gesture and often take the PICC in hand.

In certain circumstances, such a movement is not convenient for the user and it may take time. For example, when a user want to access a public transport network he has to tap to the fare media of the gate.

There is a need for a hands free solution where a communication session is automatically set between the contactless reader and the user's device without the need to tap.

SUMMARY OF THE INVENTION

An object of the invention is to solve the above mentioned technical problem.

The object of the present invention is a method for managing communication between a contactless reader and a portable device, said contactless reader being able to communicate using a first wireless technology configured to communicate in a short-range mode. The method comprises the following steps:
  establishing a first communication channel between the contactless reader and a wireless unit,
  establishing between the wireless unit and the portable device a second communication channel using a second wireless technology, said second wireless technology being configured:
    to operate with a range greater than that of said first wireless technology,
    to detect the position of the portable device with respect to the wireless unit,
    to handle an anti-collision phase,
  establishing a bridge between the contactless reader and the portable device through said first and second communication channels only if the detected position of the portable device matches with the contactless reader.

Advantageously, said first communication channel may be established using said first wireless technology.

Advantageously, said first communication channel may be established using a wired communication technology.

Advantageously, the first wireless technology may be the Near Field Communication and said second wireless technology may be the Ultra-Wideband.

Advantageously, said second wireless technology may be configured with the following parameters/operating mode: an impulse Ultra wide band signal generated using short baseband pulses from 100 picosecond to 1 nanosecond, using pulse position modulation for data transmission or binary phase shift keying, wherein a non-uniform inter pulse spacing may be used, wherein the pulse repetition frequency can range from hundreds of thousands to billions of pulse/seconds and wherein predictable time hopping sequence technics may be used.

Advantageously, the bridge between the contactless reader and the portable device may be established only if both the detected position of the portable device and the movement direction of the portable device match with the contactless reader.

Another object of the invention is a wireless unit able to establish a first communication channel with a contactless reader able to communicate using a first wireless technology configured to communicate in a short-range mode. The wireless unit is configured to establish with a portable device a second communication channel using a second wireless technology. The second wireless technology is configured:
  to operate with a range greater than that of said first wireless technology,
  to detect the position of the portable device with respect to the wireless unit, and
  to handle an anti-collision phase.
The wireless unit is configured to establish a bridge between the contactless reader and the portable device through said first and second communication channels only if the detected position of the portable device matches with the contactless reader.

Advantageously, the wireless unit may be configured to extract a frequency from an electromagnetic field generated by the contactless reader and to use said frequency as a base reference for managing said second wireless technology.

Advantageously, the first communication channel may be established using said first wireless technology and the wireless unit may be configured to run using only power extracted from an electromagnetic field generated by the contactless reader.

Advantageously, the first wireless technology may be the Near Field Communication and said second wireless technology may be the Ultra-Wideband.

Advantageously, the wireless unit may be configured to establish the bridge between the contactless reader and the portable device only if both the detected position of the portable device and the measured movement direction of the portable device match with the contactless reader.

Another object of the invention is a portable device able to establish a direct communication channel with a contactless reader using a first wireless technology configured to communicate in a short-range mode. The portable device is configured to establish with a wireless unit a second communication channel using a second wireless technology which is configured:
  to operate with a range greater than that of said first wireless technology,
  to detect the position of the portable device with respect to the wireless unit, and to handle an anti-collision phase.

The portable device is configured to exchange incoming messages generated by the contactless reader and outgoing messages targeting the contactless reader through said second communication channel.

Another object of the invention is a system comprising a contactless reader, a portable device according to the invention and a wireless unit according to the invention.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of contactless system where a portable contactless device is intended to establish a communication session with a contactless reader. The portable contactless device may be any device associated with a user. For example, the portable contactless device may be a mobile phone, a tablet, a wearable device (like a watch or a bracelet) or an Electronic Funds Transfer Terminal for payment. Preferably, the contactless reader is a fixed device like access control machine for transport network or a building.

The terms "wireless unit" and "wireless device" are considered to have the same meaning in this specification.

Figure 1:
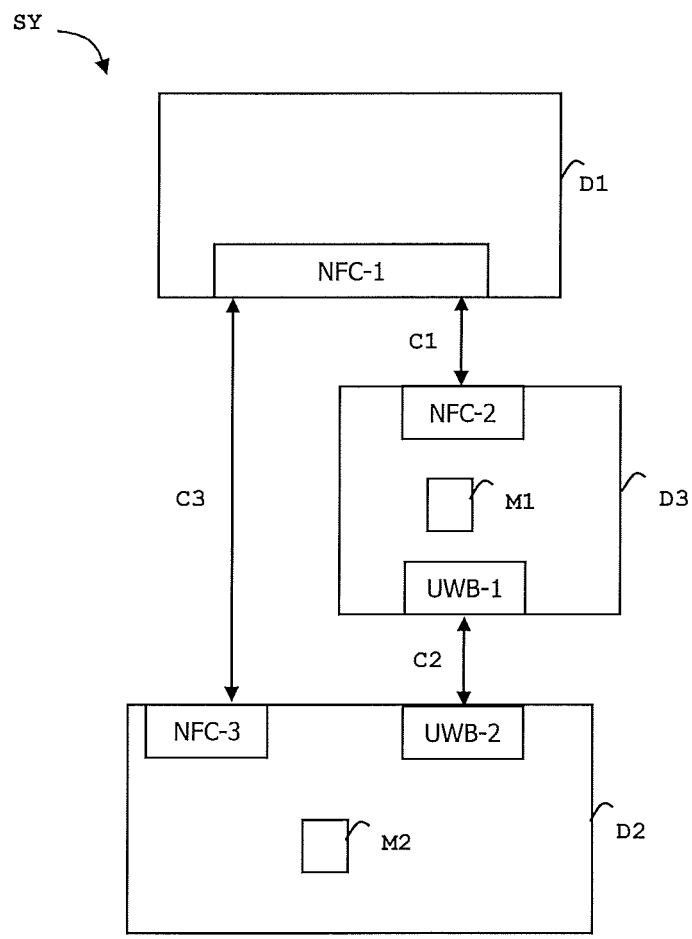
FIG. 1 depicts schematically an example of architecture of a system including a contactless reader, a wireless unit and a portable contactless device according to the invention.

FIG. 1 shows an example of system SY including a contactless reader D1, a wireless unit D3 and a portable contactless device D2 according to the invention.

The contactless reader D1 comprises a communication interface NFC-1 able to communicate according to a standard belonging to Near Field Communication domain. The contactless reader D1 may be a conventional NFC reader.

In this example, a wireless unit D3 is fixed near the contactless reader D1. For instance, the wireless unit D3 may be a sticker placed on the contactless reader D1. Alternatively, the wireless unit D3 may be placed close to the contactless reader D1 or embedded in the contactless reader D1 itself.

The wireless unit D3 comprises a communication interface NFC-2 able to communicate according to the same standard as the communication interface NFC-1. Thus a communication channel C1 may be established using a NFC protocol between the interfaces NFC-1 and NFC-2.

The wireless unit D3 comprises a communication interface UWB-1 able to communicate according to another radio technology configured:
  to operate with a range greater than the range of the NFC technology,
  to detect the position of the portable device D2 with respect to the wireless unit D3, and
  to handle an anti-collision phase.

The wireless unit D3 is set to establish a communication channel C2 with the portable contactless device D2 through the communication interface UWB-1.

The wireless unit D3 comprises a bridge agent M1 configured to establishing a bridge between the communications interfaces NFC-2 and UWB-1 only if the detected position of the portable device D2 matches with the contactless reader D1. In other words, the bridge agent M1 is adapted to establish a bridge between the contactless reader D1 and the portable device D2 through said first and second communication channels C1 and C2 only if the detected position of the portable device D2 matches with the location of the contactless reader D1.

The portable contactless device D2 comprises a communication interface NFC-3 able to communicate according to the same standard as the communication interface NFC-1. Thus a communication channel C3 may be established using a NFC protocol between the interfaces NFC-1 and NFC-3 when the portable contactless device D2 is placed close to the reader D1.

The portable contactless device D2 comprises a communication interface UWB-2 configured to communicate according to the same standard as the communication interface UWB-1. Thus a communication channel C2 may be established using a UWB (Ultra-Wide Band or Ultra-Wideband) protocol between the interfaces UWB-1 and UWB-2.

The portable contactless device D2 comprises an applicative agent M2 able to run an applicative transaction with the contactless reader D1. For instance, the applicative agent M2 may be an application designed to transport access or a payment. The applicative agent M2 may be implemented in a conventional secure element embedded in the portable contactless device D2.

In this example, the portable contactless device D2 can access the contactless reader through two distinct ways: either using the conventional NFC scheme or via the wireless unit D3.

In another example, the portable contactless device D2 is devoid of the communication interface NFC-3 and can access the contactless reader through only one way: through the wireless unit D3.

UWB is defined by IEEE 802.15.4a standard. Conventional radio transmissions systems transmit information by varying the power level, frequency, and/or phase of a sinusoidal wave. Unlike Conventional radio transmissions systems, UWB transmit information by generating radio energy at specific time intervals and occupying a large bandwidth, thus enabling pulse-position or time modulation. The information can also be modulated on UWB signals (pulses) by encoding the polarity of the pulse, its amplitude and/or by using orthogonal pulses. UWB pulses can be sent sporadically at relatively low pulse rates to support time or position modulation. An important aspect of UWB technology is the ability for a UWB radio system to measure the distance between two communicating objects and to detect the position of a communicating object relative to another communicating object with an accurate precision.

A signal with ultra-wide bandwidth is generated using electrical short, baseband pulses (100 ps to 1 ns. Data transmission is made through pulse modulation: either Amplitude, or position or phase modulation. The Base-band pulses are applied directly to the antenna. This technology may be used thanks to low cost equipment with minimal RF components.

UWB signals are typically modulated pulse trains, usually very short pulse duration (i.e. <1 ns). Uniform or non-uniform inter-pulse spacing may be set. Pulse repetition frequency (PRF) can range from hundreds of thousands to billions of pulses/second. Modulation techniques include pulse-position modulation, binary phase-shift keying and others.

Thanks to the UWB technology, it is possible to localize object (like tags) using this transmission method with good accuracy. Typically, 15 cm at 10 meters is usually achieved.

In addition, Impulse UWB, allow several other important characteristics. In particular, UWB may be set to use Time hopping sequence, where Time hopping Sequence (THS) is predictable to user who knows a specific secret so that pulses appear random unless the user know the secret allowing to identify the time hopping sequence.

UWB technology is able to resist to Channel Impairments (interferences) because multiple paths are distinguishable. It can be implemented to be robust to interference and to reliably manage anti-collision.

UWB technology require a very precise clock reference in order to manage data transmission, time hoping sequences and pulses generations. One the advantage of the present invention is the use the 13.56 MHz clock frequency provided by the magnetic field generated by the NFC reader. Thanks to this combination of RF signal it is possible to achieve an ultra-low power UWB generator, able to be powered by the NFC reader RF magnetic field.

Advantageously, the clock retrieved from the NFC field (i.e. 13.56 MHz) is used as clock reference for the USB transmission. The use of a time reference provided by the RF NFC field allows to minimize the power consumption needed to manage the clock used for UWB communication. Thus design avoids using an internal clock hardware component which is deemed to have a high energy consumption.

It is to be noted that the data transmission rate via the UWB technology is so high that it has no significant impact on the transmission between the contactless reader D1 and the portable contactless device D2.

Figure 2:
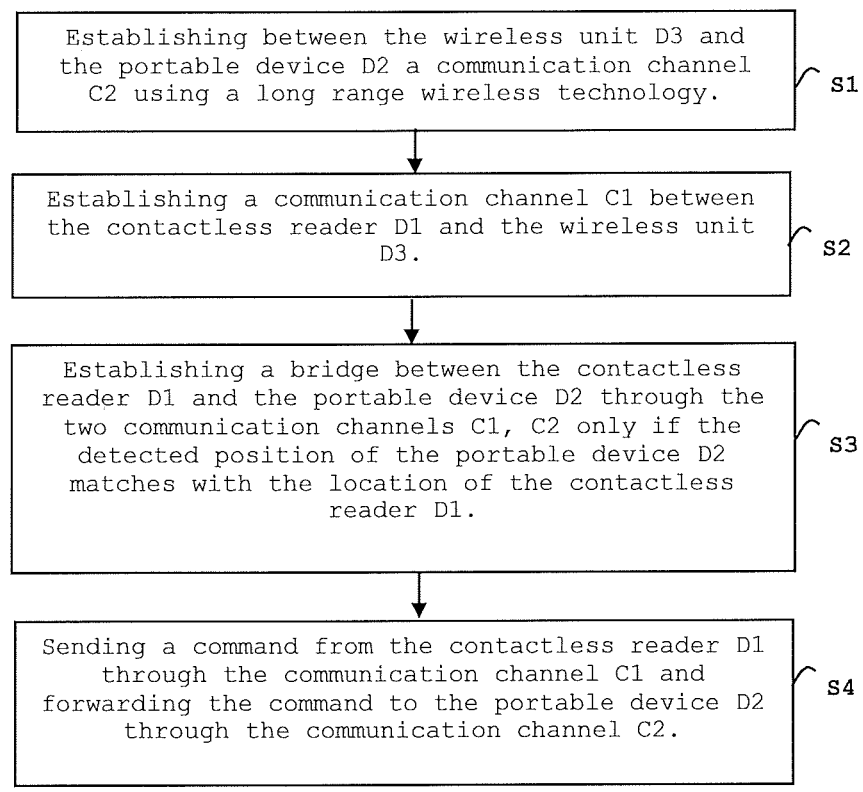
FIG. 2 is an example of a flowchart for establishing a communication session between a contactless reader and a portable contactless device according to the invention.

FIG. 2 shows an example of a flowchart for establishing a communication session between a contactless reader D1 and a portable contactless device D2 according to the invention.

The contactless reader D1, the portable contactless device D2 and wireless unit D3 are assumed to have architectures similar to those described at FIG. 1.

At first step S1, the wireless unit D3 and the portable device D2 establish a communication channel C2 using a long range wireless technology, like UWB for instance.

At second step S2, the contactless reader D1 and the wireless unit D3 establish a communication channel C1. In this example, they can establish a NFC channel for instance.

Note that steps S2 may be run before step S1.

At third step S3, the wireless unit D3 establish a bridge between the contactless reader D1 and the portable device D2 through the two communication channels C1, C2 only if the detected position of the portable device D2 matches with the location of the contactless reader D1.

At fourth step S4, if the bridge has been set, the contactless reader D1 may send a command through the communication channel C1 and the command is forwarded to the portable device D2 through the communication channel C2. A response to the command can also take the same path in opposite sense.

Thus the contactless reader D1 can complete a transaction with the portable contactless device D2 even if these devices are separated by a distance greater than the distance required for a conventional NFC transaction.

Moreover, the bridge (i.e. communication link) between the contactless reader D1 and the portable contactless device D2 is established only if the portable contactless device D2 has a location that matches with the location of the contactless reader D1. Thus the invention allows to run a transaction with the contactless reader D1 only if this reader D1 is the one which is targeted by the user which brings the portable contactless device D2.

Figure 3:
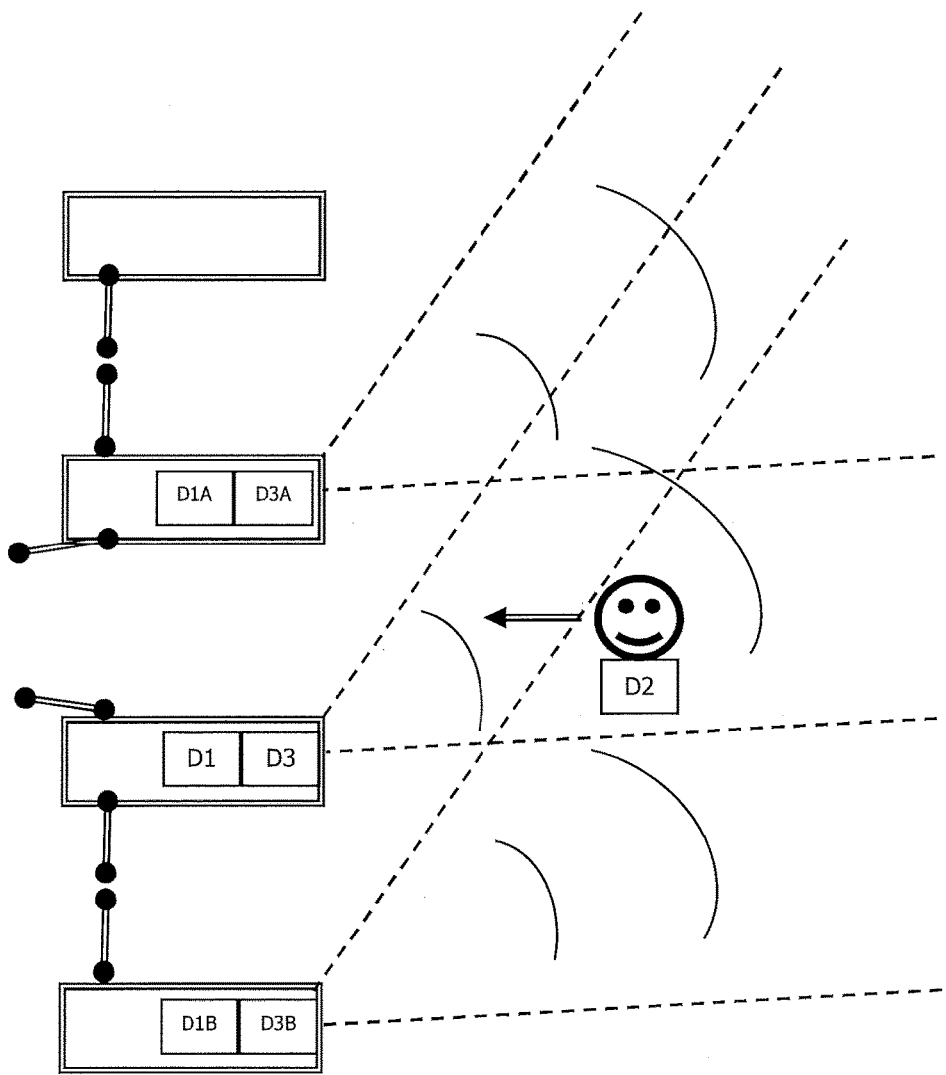
FIG. 3 depicts schematically an example an automatic fare collection system upgraded according to the invention.

FIG. 3 shows an example of an automatic fare collection system using an embodiment of the invention.

The automatic fare collection system comprises three gates which are configured to allow access only to authorized users. An authorized user is assumed to bring a personal token like the portable contactless device D2. In this embodiment, each gate comprises its own NFC reader (D1, D1A, respectively D1B) and its own wireless unit (D3, D3A, respectively D3B) placed near the NFC reader.

When the user enters the range of the wireless unit D3, the step sequence described at FIG. 2 can be run. The wireless unit D3 can determine that the user is in front of the gate associated with the contactless reader D1, even if the user must still walk several meters to reach the gate. Thus the NFC transaction allows the system to anticipate the gate opening.

No specific gesture is required from the user: he just has to bring the portable contactless device D2, in a pocket, a bag or as a wearable object for example.

Advantageously, thanks to UWB features, the wireless unit D3 can also determine the movement direction of the portable contactless device D2 so as to take into account the walk direction of the user. Thus the selection of the relevant gate (i.e. relevant NFC reader) can be refined. The movement direction may be computed from a sequence of measures of the device position.

In another embodiment, each gate has its own NFC reader and a single wireless unit D3 is associated with the full automatic fare collection system. In this case, the wireless unit D3 can connect each of the NFC readers through a communication channel different from NFC. Preferably, the wireless unit D3 may communicate with each of the NFC readers through a wired channel. Alternatively, they may use a wireless protocol like Bluetooth® or any contactless technology having an appropriate range.

Note that since each gate has its own NFC reader, users who have a conventional NFC token can still use the automatic fare collection system.

It is to be noted that the wireless unit according to the invention may be added to a conventional automatic fare collection system by simply adding a sticker placed near the contactless reader of the existing infrastructure. Thus existing infrastructure may be kept while taking advantage of the invention. (provided that new portable contactless device D2 are given to users)

Advantageously, the wireless unit D3 can be configured to manage several UWB channels in parallel in order to establish simultaneous channels with as many portable contactless devices. Then identification of the targeted contactless reader (i.e. gate intended to be used by the user) and establishment of the relevant bridge may be done when the accuracy of the position/movement of the portable contactless device reaches a preset threshold.

Figure 4:
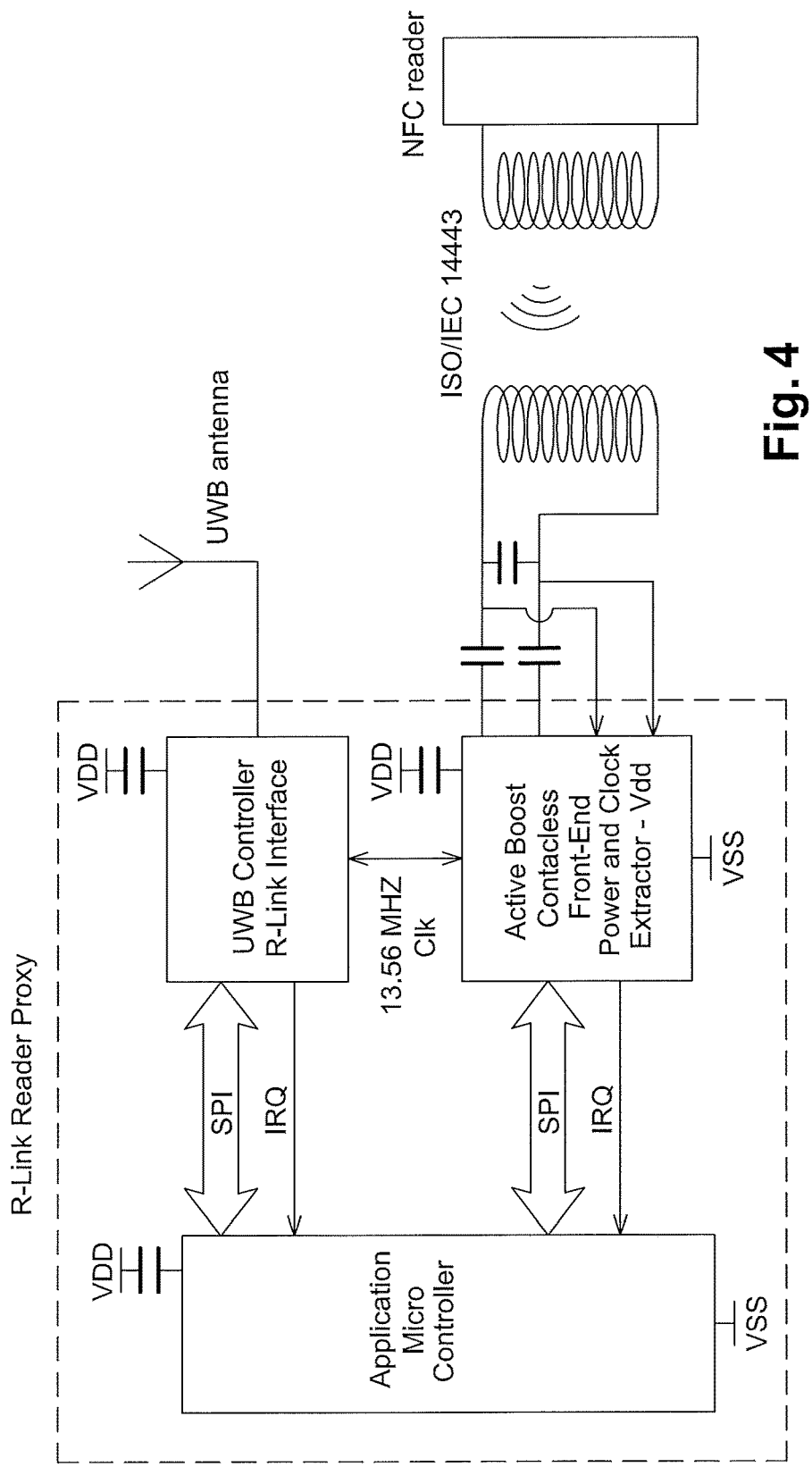
FIG. 4 depicts schematically an example of architecture of a wireless unit according to the invention.

FIG. 4 depicts schematically the architecture of the wireless unit D3 according to an example of the invention.

The wireless unit D3 (also named R-Link Reader Proxy) comprises an RF antenna configured to communicate through ISO/IEC 14443 standard with a conventional NFC reader.

The wireless unit D3 comprises an Active Boost Contactless Front-End connected to the RF antenna. The Active Boost Contactless Front-End is configured to get energy from the electromagnetic field generated by the NFC reader (i.e. Power extractor feature). It is assumed that the extracted energy allows to power the wireless unit D3 (i.e. without battery). The Active Boost Contactless Front-End is configured to retrieve a clock reference (or frequency reference) from the electromagnetic field generated by the NFC reader (i.e. Clock extractor feature). The Active Boost Contactless Front-End is also configured to receive transaction messages from the NFC reader and to transmit response to the NFC reader by modulating the reader magnetic field as described in ISO/IEC 14443 standard.

The wireless unit D3 comprises a UWB antenna and a UWB controller in charge of managing the UWB interface (R-Link interface). The UWB interface is configured with the following parameters and operating mode: an impulse Ultra wide band signal generated using short baseband pulses from 100 picosecond to 1 nanosecond, using pulse position modulation for data transmission or binary phase shift keying, where a non-uniform inter pulse spacing is used. The pulse repetition frequency (PRF) can range from hundreds of thousands to billions of pulse/seconds. This impulse Ultra wide band uses a predictable time hopping sequence technics (THS) where pulses appear random.

The UWB interface is designed to manage anti-collision mechanism. It is adapted to select one portable device among a plurality of devices. Preferably, the UWB controller and the Active Boost Contactless Front-End are linked and the UWB controller is configured so that the UWB controller uses the reference clock (13.56 MHz) extracted from the NFC reader field by the Active Boost Contactless Front-End. Thus the wireless unit can be configured to extract a frequency from the electromagnetic field generated by the contactless reader D1 and to use the extracted frequency as a base reference for managing the UWB communication.

The wireless unit D3 comprises an application controller (Application Micro Controller) connected to both the Active Boost Contactless Front-End and the UWB controller. The application controller is configured to run a direct NFC transaction with a NFC reader through the Active Boost Contactless Front-End and RF antenna. (i.e. corresponding to the communication channel C3 of FIG. 1) The application controller is also configured to acts as a bridge (e.g. range extender) between the NFC reader and a portable contactless device equipped with its own UWB interface. (i.e. corresponding to combination of communication channels C1 and C2 of FIG. 1) In one example, the application controller may be configured to encapsulate NFC messages into UWB messages and extract NFC messages from UWB messages.

In another example, the application controller may be configured to translate incoming NFC messages in outgoing UWB messages and to translate incoming UWB messages into outgoing NFC messages.

The application controller is configured to establish the bridge only if the detected position of the portable contactless device matches with the location of the NFC reader. The matching operation may implemented through a comparison between the measured position and a preset physical area associated with the NFC reader.

Advantageously, the application controller may be configured to take into account both the detected position and movement direction of the portable contactless device relative to the NFC reader. Thus only a portable contactless device which is clearly moving towards the NFC reader will be considered.

At FIG. 4, VDD is the DC Power supply created thanks to the energy extracted from the NFC RF field, usually it is a 3.3 Vdc. VSS is the ground (i.e. 0 Vdc).

Figure 5:
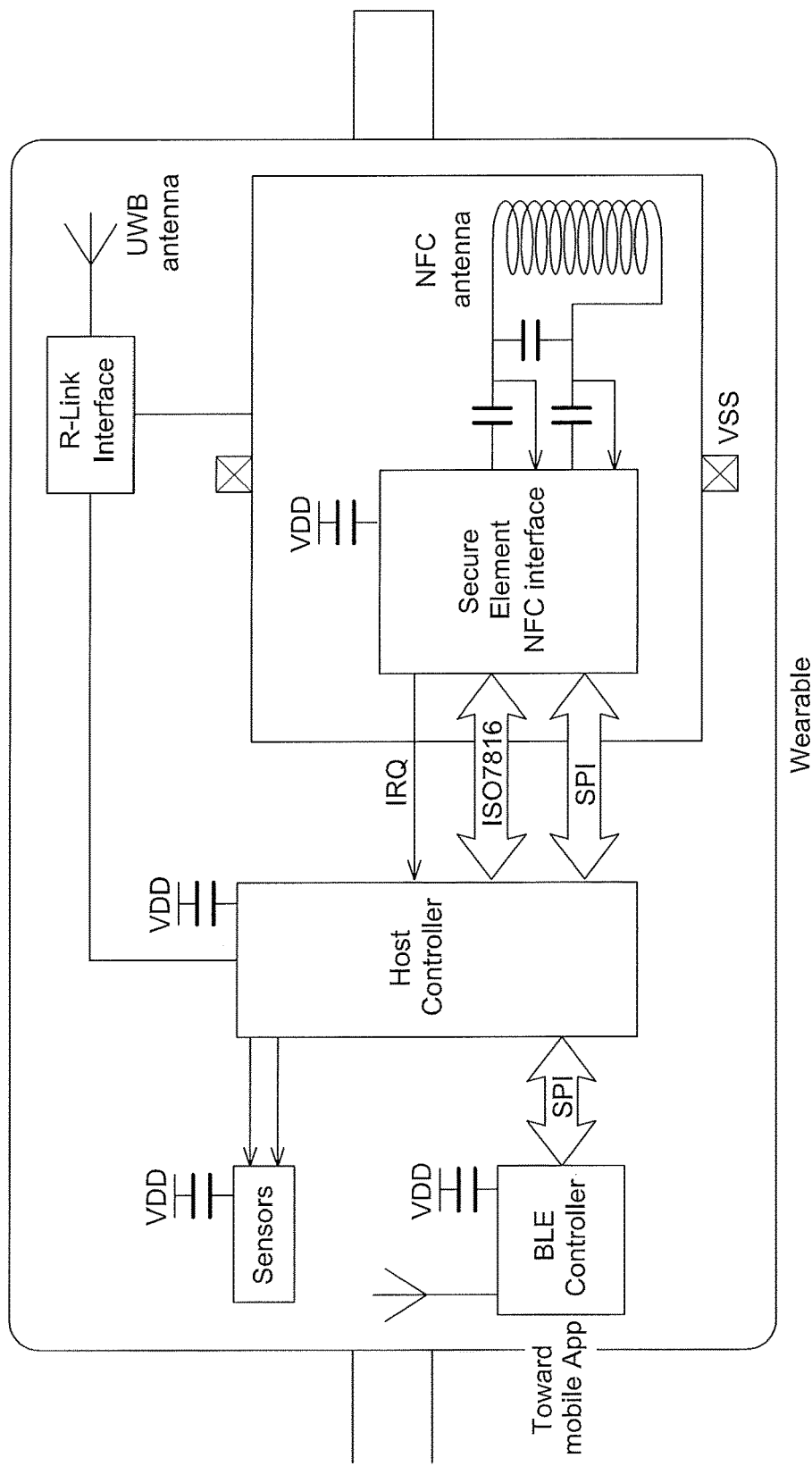
FIG. 5 depicts schematically an example of architecture of a portable contactless device according to the invention.

FIG. 5 depicts schematically the architecture of the portable contactless device D2 according to an example of the invention.

The portable contactless device D2 (wearable) comprises an NFC antenna configured to communicate through ISO/IEC 14443 standard with a conventional NFC reader. In the example of FIG. 5, the portable contactless device D2 comprises a secure element dedicated to manage NFC transactions.

The portable contactless device D2 comprises a UWB antenna and a UWB interface (R-Link interface). The UWB interface is configured communicate with the UWB interface of the wireless unit according to the invention. The portable contactless device D2 comprises a host controller connected to both the secure element and the UWB interface.

The host controller is configured to redirect data between the UWB interface and the secure element.

In one example, the host controller may be configured to extract NFC messages from incoming UWB messages and to encapsulate NFC messages into outgoing UWB messages.

In another example, the host controller may be configured to translate incoming UWB messages in NFC messages (or any other communication protocol like ISO7816, SWP or SPI) and to translate messages coming from the secure element into outgoing UWB messages.

For instance, the host controller can retrieve data received by the UWB interface and send the data to the secure element via a contact ISO7816 interface.

Alternatively, the UWB interface may be directly connected to the secure element. In this case, the UWB interface is configured to directly exchange data with the secure element.

As shown at FIG. 5, the portable contactless device D2 may comprise a Sensors and a Bluetooth® Low Energy interface (BLE controller). These features are not required to implement the present invention.

Thanks to the portable contactless device D2 of FIG. 5, a user can access a usual automatic fare collection system by tapping the portable contactless device D2 to the NFC reader. The user can also access an automatic fare collection system upgraded according to the invention without any specific gesture.

At FIG. 5, VDD is the DC Power supply. Usually it is a 3.3 Vdc. The power may come from a battery (not shown). VSS is the ground (i.e. 0 Vdc).

It must be understood, within the scope of the invention, that the above-described embodiments are provided as non-limitative examples.

In particular, the contactless reader may communicate with a radio technology different from the ISO14443. It may be compliant with ISO18092 or ISO15693 standards for instance.

The invention is not limited to NFC communication and may apply to any kinds of contactless communication where the range need to be extended.

The invention is not limited to the described embodiments or examples. In particular, the invention may apply to payment transactions, access to a service, or access to a building.

The invention claimed is:

1. A method for managing communication between a contactless reader and a portable device, said contactless reader being able to communicate using a first wireless technology configured to communicate in a short-range mode, wherein the method comprises the following steps:

establishing a first communication channel between the contactless reader and a wireless unit, establishing between the wireless unit and the portable device a second communication channel using a second wireless technology, said second wireless technology being an Ultra-Wide Band protocol which is configured:

to operate with a range greater than that of said first wireless technology, to detect the position of the portable device with respect to the wireless unit, to handle an anti-collision phase, and establishing a bridge between the contactless reader and the portable device through said first and second communication channels only if the detected position of the portable device is located in a preset physical area associated with the contactless reader.

2. A method according to claim 1, wherein said first communication channel is established using said first wireless technology.

3. A method according to claim 1, wherein said first communication channel is established using a wired communication technology.

4. A method according to claim 1, wherein the first wireless technology is the Near Field Communication.

5. A method according to claim 1, wherein said second wireless technology is configured with the following parameters/operating mode: an impulse Ultra wide band signal generated using short baseband pulses from 100 picosecond to 1 nanosecond, using pulse position modulation for data transmission or binary phase shift keying, wherein a non-uniform inter pulse spacing is used, wherein the pulse repetition frequency can range from hundreds of thousands to billions of pulse/seconds and wherein predictable time hopping sequence technics is used.

6. A method according to claim 1, wherein the bridge between the contactless reader and the portable device is established only if both the detected position of the portable device and the movement direction of the portable device match with the contactless reader.

7. A wireless unit able to establish a first communication channel with a contactless reader able to communicate using a first wireless technology configured to communicate in a short-range mode, wherein the wireless unit is configured to establish with a portable device a second communication channel using a second wireless technology, wherein said second wireless technology is an Ultra-Wide Band protocol which is configured:

to operate with a range greater than that of said first wireless technology, to detect the position of the portable device with respect to the wireless unit, to handle an anti-collision phase, and wherein the wireless unit is configured to establish a bridge between the contactless reader and the portable device through said first and second communication channels only if the detected position of the portable device is located in a preset physical area associated with the contactless reader.

8. A wireless unit according to claim 7, wherein the wireless unit is configured to extract a frequency from an electromagnetic field generated by the contactless reader and to use said frequency as a base reference for managing said second wireless technology.

9. A wireless unit according to claim 7, wherein said first communication channel is established using said first wireless technology and wherein the wireless unit is configured to run using only power extracted from an electromagnetic field generated by the contactless reader.

10. A wireless unit according to claim 7, wherein the first wireless technology is the Near Field Communication.

11. A wireless unit according to claim 7, wherein the wireless unit is configured to establish the bridge between the contactless reader and the portable device only if both the detected position of the portable device and the measured movement direction of the portable device match with the contactless reader.

12. A portable device able to establish a direct communication channel with a contactless reader using a first wireless technology configured to communicate in a short-range mode, wherein the portable device is configured to establish a second communication channel, using a second wireless technology, with a wireless unit that communicates with the contactless reader, said second wireless technology being an Ultra-Wide Band protocol which is configured:

to operate with a range greater than that of said first wireless technology, to detect the position of the portable device with respect to the wireless unit, to handle an anti-collision phase, and wherein the portable device is configured to exchange incoming messages generated by the contactless reader and outgoing messages targeting the contactless reader through said second communication channel only if the detected position of the portable device is located in a preset physical area associated with the contactless reader.

13. A portable device according to claim 12, wherein the first wireless technology is the Near Field Communication.

14. A system comprising a contactless reader and a portable device, wherein portable device is the portable device of claim 12, and wherein the system further comprises a wireless unit configured to establish a first communication channel with the contactless reader using the first wireless technology, wherein the wireless unit is configured to establish with the portable device a second communication channel using the second wireless technology, and wherein the wireless unit is configured to establish a bridge between the contactless reader and the portable device through said first and second communication channels only if the detected position of the portable device is located in the preset physical area associated with the contactless reader.

* * * * *